(12) United States Patent
Vines

(10) Patent No.: US 8,127,488 B2
(45) Date of Patent: Mar. 6, 2012

(54) NO-SMEAR FLYSWATTER

(75) Inventor: John C. Vines, Euless, TX (US)

(73) Assignee: John C. Vines, Euless, TX (US)

( * ) Notice: Subject to any disclaimer, the term of this patent is extended or adjusted under 35 U.S.C. 154(b) by 0 days.

(21) Appl. No.: 11/800,625

(22) Filed: May 7, 2007

(65) Prior Publication Data

US 2007/0204504 A1 Sep. 6, 2007

Related U.S. Application Data

(63) Continuation of application No. 11/368,119, filed on Mar. 3, 2006, now abandoned.

(60) Provisional application No. 60/658,332, filed on Mar. 3, 2005.

(51) Int. Cl.
A01M 3/02 (2006.01)

(52) U.S. Cl. .......................................... 43/137

(58) Field of Classification Search ............... 43/139, 43/137
See application file for complete search history.

(56) References Cited

U.S. PATENT DOCUMENTS

| | | | |
|---|---|---|---|
| 1,081,364 A | 12/1913 | Chapman | |
| 1,161,654 A * | 11/1915 | Gomber | 43/137 |
| 1,190,165 A | 7/1916 | Hemenway | |
| 1,277,216 A * | 8/1918 | Hutton | 43/137 |
| 1,299,580 A * | 4/1919 | Krumlaw | 43/137 |
| 1,331,266 A * | 2/1920 | Keplinger | 43/137 |
| RE15,154 E * | 7/1921 | Gomber | 43/137 |
| 1,412,312 A * | 4/1922 | Little | 43/137 |
| 1,591,870 A | 7/1926 | Wood | |
| 1,650,548 A * | 11/1927 | Sullivan | 43/137 |
| 1,802,774 A | 4/1931 | Nixon | |
| 1,860,939 A * | 5/1932 | Miller | 43/137 |
| 1,861,378 A * | 5/1932 | Bloodgood | 43/136 |
| 1,939,838 A | 12/1933 | Wasson | |
| 2,066,248 A * | 12/1936 | Buhler | 43/137 |
| 2,093,659 A * | 9/1937 | Kahler | 43/135 |
| 2,131,534 A * | 9/1938 | Gatch | 43/137 |
| 2,651,878 A * | 9/1953 | Webbeking | 43/137 |
| 2,891,347 A * | 6/1959 | Swint | 43/137 |
| 3,023,540 A * | 3/1962 | Schwab | 43/137 |
| 3,308,571 A | 3/1967 | Jones | |
| 3,673,730 A | 7/1972 | Hegenberger | |
| 3,798,828 A * | 3/1974 | Walti et al. | 43/137 |
| 3,984,937 A * | 10/1976 | Hamilton | 43/137 |
| 4,593,489 A * | 6/1986 | Gott et al. | 43/137 |
| 4,653,222 A | 3/1987 | Viscosi | |
| 4,674,227 A * | 6/1987 | Maier | 43/137 |
| 4,905,408 A * | 3/1990 | Wu | 43/137 |
| 5,522,174 A * | 6/1996 | Wagner et al. | 43/137 |
| 5,568,699 A * | 10/1996 | Wadsworth | 43/137 |
| 5,586,407 A * | 12/1996 | Raymond | 43/137 |
| 7,540,112 B1 * | 6/2009 | Crenshaw | 43/137 |

* cited by examiner

*Primary Examiner* — Darren W Ark
(74) *Attorney, Agent, or Firm* — Marc A. Hubbard; Gardere Wynne Sewell LLP

(57) ABSTRACT

A flyswatter (10) having an elastically deformable swatting member (16) with a plurality of protrusions (20) formed thereon. The protrusions (20) are spaced apart on the swatting member (16), and have a height somewhat less than the height of the insect. When the swatting member (16) is struck on an object upon which the insect rests, the protrusions (20) contact the object, and the swatting member (16) elastically deforms and bows outwardly and strikes the insect without flattening or squishing the insect.

18 Claims, 4 Drawing Sheets

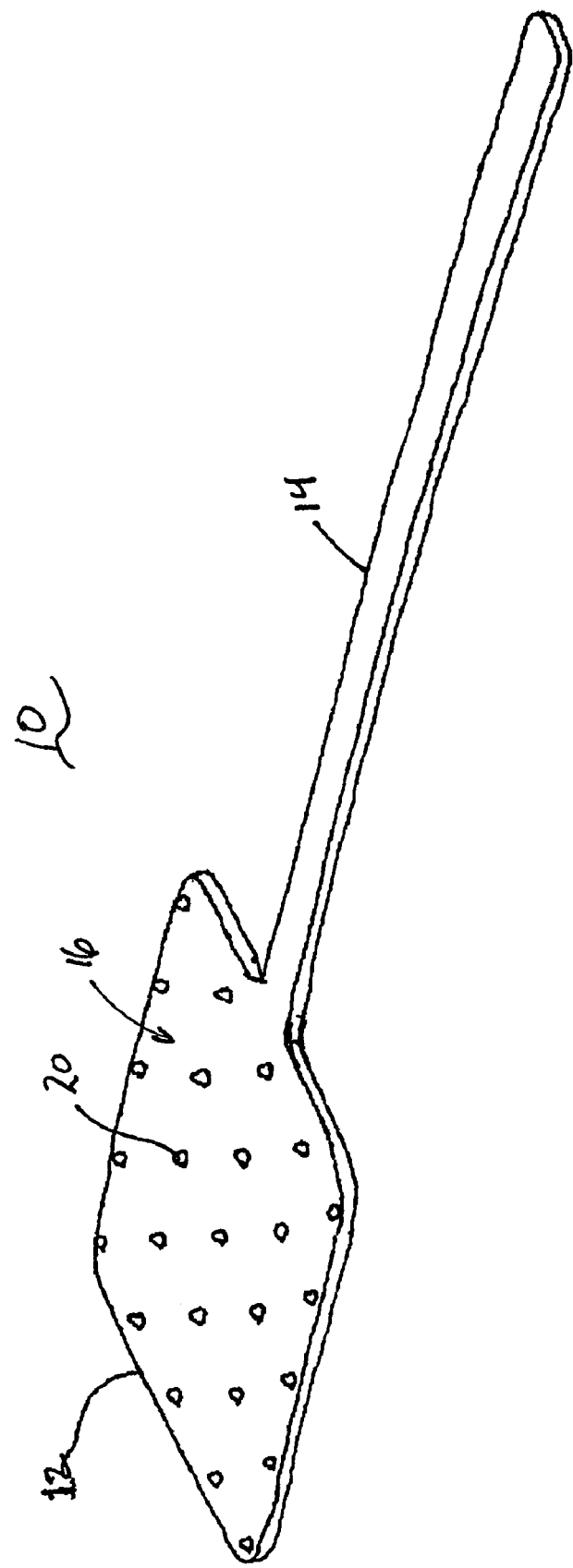

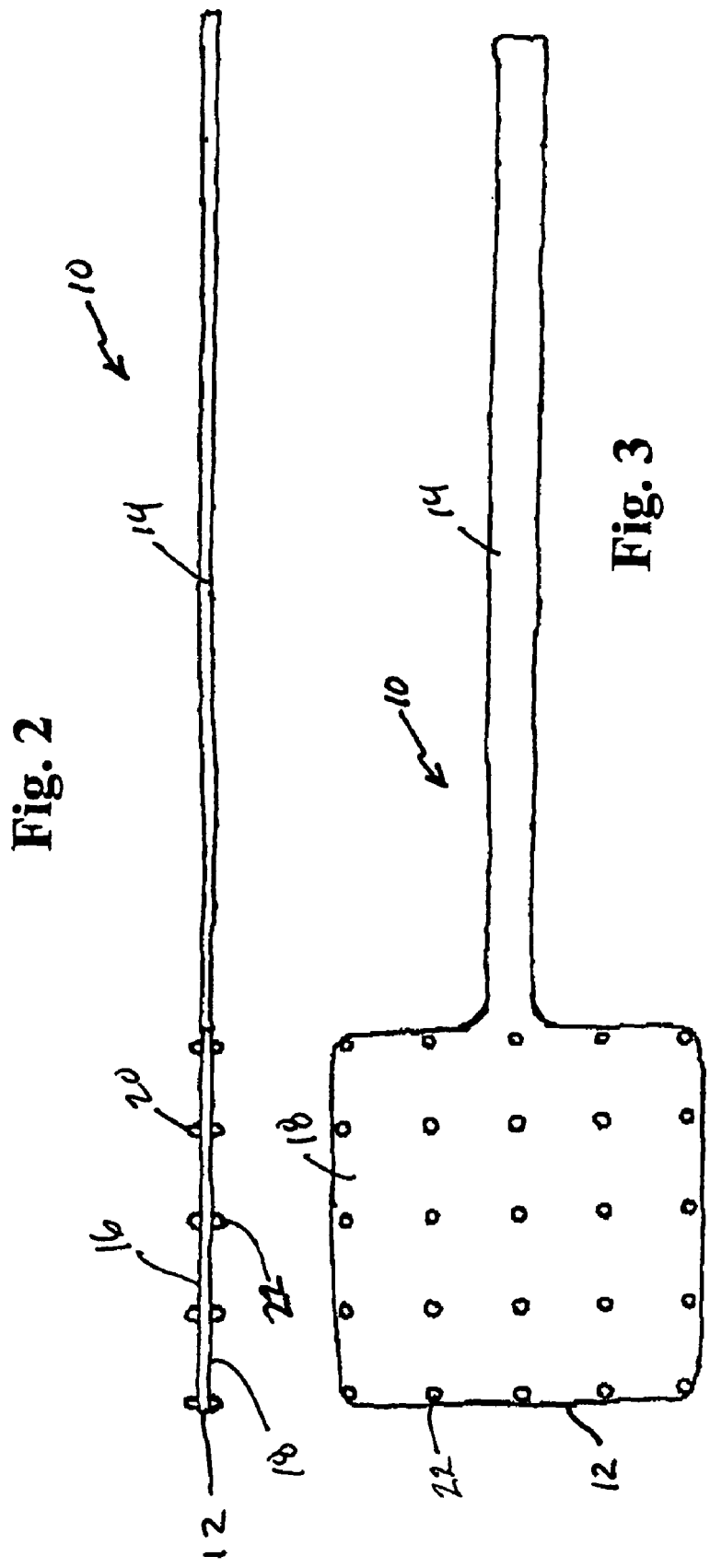

NO-SMEAR FLYSWATTER

RELATED APPLICATIONS

This non-provisional patent application is a continuation of U.S. patent application Ser. No. 11/368,119, filed Mar. 3, 2006 now abandoned, which claims the benefit of U.S. provisional patent application Ser. No. 60/658,332, filed Mar. 3, 2005, entitled "No-Smear Flyswatter," the disclosures of which are incorporated herein by reference.

TECHNICAL FIELD OF THE INVENTION

The present invention relates in general to fly swatters, and more particularly to flyswatters of the type that reduce the likelihood of leaving insect residue when struck.

BACKGROUND OF THE INVENTION

Flyswatters have been used for many, many years. Many attempts have been made to overcome various problems with flyswatters and the use thereof, as evidenced by the many patents directed to such subject matter. For example, the following patents illustrate the various advancements made in the field of flyswatters: U.S. Pat. Nos. 1,299,580 by Knimlaw; 1,412,312 by Little; 1,650,548 by Sullivan; 1,860,939 by Miller and 3,673,730 by Hegenberger.

The most common application of a typical flyswatter is to swat an insect and smash it between the flat striking surface of the flyswatter and an object on which the insect rests. A sufficient force is applied to crush or severely harm the insect, resulting in its subsequent death. In this process the delicate body of the insect is usually smeared or broken apart—leaving a mess or residue on both flyswatter and the object supporting the insect.

Often, when a flyswatter is used, it will not be swung with the full force available to the person using the flyswatter, because they know that doing so will smear the insect all over the object. Thus, a person using a flyswatter will typically try to swing fast enough to catch the insect, but slow at the very end of the actual strike so as not to smear the residue of the insect over the object. The problem with this is that it makes it more difficult to catch fast-moving insects.

The present invention eliminates this problem because the user does not need to be concerned with slowing down the motion of the flyswatter, or trying to hit the insect at an angle so as to not smear it. With the present invention, the user can swing the flyswatter as fast and as hard as they want, and attempt to land the flyswatter flat against the insect resting surface, and be comfortable with the assurance that the insect will not be smeared all over the object. Performing the operation in this way also maximizes the chances of actually striking the insect.

It can be seen that a need exists for a flyswatter involving a relatively minor modification to conventional flyswatter designs, thereby eliminating or greatly reducing the mess associated with a standard insect swatting operation.

SUMMARY OF THE INVENTION

According to a feature of one embodiment of the invention, disclosed is a flyswatter having an array, collection, or pattern of relatively small protuberances, or raised features distributed on at least one striking surface of the flyswatter. The purpose or effect of the spaced-apart protrusions is to leave a gap during the swatting operation between the striking surface of the flyswatter and the object on which the insect rests.

According to an advantage of the invention, the relatively small gap between the object and the striking surface of the flyswatter is to limit the amount of mechanical compression imposed on the insect. Because the amount of mechanical compression imposed on the insect is reduced, the insect is less likely to break apart or smear on either the flyswatter or the object. The primary goal to kill the insect while still leaving the body of the insect generally intact and/or mostly whole, is thus achieved.

The extent of the gap between the elastically deflected swatting member and the object is determined as a function of the height of the protrusions, where the protrusions are positioned on or in relation to the otherwise-flat striking surface, the elasticity of the material from which the swatting member is constructed, and the velocity of the swatting member at the moment of impact. If the flyswatter is intended for use with larger insects, then a larger gap can be provided by making the flyswatter with taller protrusions on (or related to) the striking surface. Each side of the striking surface can have protrusions of a different height. On one striking surface of the flyswatter the protrusions can be made to accommodate larger insects, and on the other striking surface the protrusions can be made to accommodate smaller insects.

According to one embodiment of the invention, disclosed is a flyswatter having a handle, and attached thereto is an elastically deformable swatting member having at least one striking surface for striking an insect. The swatting surface has a plurality of spaced-apart protrusions attached thereto, and a spacing of said protrusions are sufficient so that when the swatting member is struck against a surface on which the insect rests, portions of the elastically deformable swatting member located between adjacent protrusions deform sufficiently so that one deformed portion contacts the insect. The elastically deformable swatting member and the protrusions are constructed so that a substantial portion of each deformed portion does not contact the surface during the swatting operation.

According to another embodiment, disclosed is a flyswatter having a plastic handle, and attached to the handle is a plastic swatting member with a swatting surface on each side thereof. The swatting surfaces are adapted for striking an insect. Each said swatting surface has a plurality of spaced-apart plastic bumps projecting above the respective swatting surfaces, and portions of the swatting member located between neighbor bumps are constructed so as be deformed toward a surface when the swatting member is struck against the surface. The deformation is convex shaped so that a crown portion of the deformed portion approaches the surface being struck. However, a substantial portion of the deformed portion does not contact the struck surface, and each deformed portion of the striking member returns to a rest state immediately subsequent to the deformation. The handle, the swatting member and the bumps are all molded as an integral flyswatter.

According to the invention, disclosed also is a method of swatting insects with a flyswatter. The method includes the steps of applying a force to the flyswatter to strike a surface on which the insect rests. The striking force of said flyswatter on the surface causes a plurality of small contact areas of said flyswatter to contact the surface, and causes the large swatting areas located between said small contact areas to elastically deform and bow toward the surface and strike the insect. Only a small area, if any, of the bowed large swatting areas contacts the surface being struck. The deformation of at least one large swatting area of the flyswatter imparts a quick and sharp impact to the insect without substantially compressing the insect on the surface.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which:

FIG. 1 is an isometric view of the top side of the flyswatter according to the invention;

FIG. 2 is a side view of a bottom side of the flyswatter of FIG. 1;

FIG. 3 is a bottom view of the flyswatter of FIGS. 1 and 2;

DETAILED DESCRIPTION OF THE INVENTION

Figure 4:
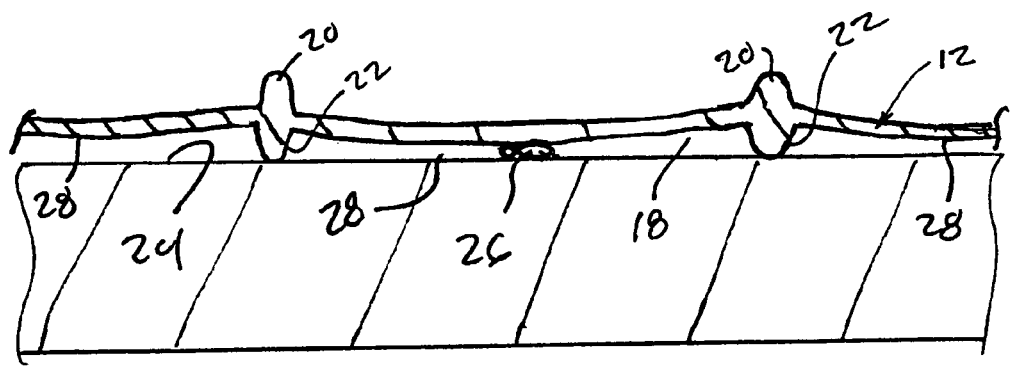
FIG. 4 is a cross-sectional view of a portion of a striking member as it deforms during a striking operation.

A typical flyswatter is constructed with a striking member that is approximately square, measuring about 4 to 4.5 inches on each side. The striking member is usually a thin flat piece of perforated plastic or rubber that is square or rectangular. The striking member includes opposing striking surfaces, each for striking an insect, or the like. The perforations function to allow air to quickly escape through the striking member, rather than from under the striking member. The striking member tends to "roll" on the object upon which the insect rests, and conforms to the shape of the object. A conventional flyswatter is constructed with a simple wire or plastic handle molded into or integral with the striking member. The wire or plastic handle is typically 16 to 18 inches long.

The flyswatter of the present invention can embody the basic design of the conventional flyswatter, with one or more modifications. The flyswatter according to the invention is constructed to provide "no-smear" characteristics. This characteristic is achieved in one form by providing an array of small convex protrusions, in the form of bumps in one embodiment, on one or both of the otherwise flat striking surfaces of the flyswatter. Other protrusions could include small ridges or ribs of various shapes and sizes that are raised above the striking surface. Because the striking surface includes protrusions, the air can quickly escape therefrom, without requiring of apertures in the striking member.

The preferred embodiment of the invention is illustrated in FIGS. 1-3. The flyswatter 10 is molded with a suitable material, and includes a substantially square striking member 12 molded integral with a handle 14. The striking member 12 is about 3/32 inch thick, and is preferably constructed of an elastically deformable material. Other striking member thicknesses could be employed to achieve an elastically deformable striking member 12. The striking member 12 can be constructed with plastic materials currently employed in making flyswatters, in addition to unbreakable, flexible plastics, such as polyethylene, polypropylene and vinyl. Perforations formed through the striking member 12 can be utilized to enhance the flexibility thereof. The perforations are formed, if at all, at locations in the swatting member, other than centered between the protrusions. Preferably, although not a necessity, the striking member 12 of the preferred embodiment is perforated. The opposing surfaces or faces of the striking member 12 can be considered striking surfaces. One striking surface 16 is shown in FIG. 1, and the opposing striking surface 18 is shown in FIGS. 2 and 3.

According to the preferred embodiment, a plurality of protrusions is distributed over the striking surfaces 16 and 18. The protrusions occupy about ten percent, or less, of the area of the striking surfaces 16 and 18. One set of protrusions is illustrated as reference numeral 20 on striking surface 16, and is considered a "bump." Another set of protrusions 22 are shown formed on the opposite striking surface 18. The height of each bump 20 formed on the striking surface 16 may be about 1/16 of an inch. The height of each bump 22 formed on the opposite striking surface 18 may be about 1/8 of an inch. Alternatively the bumps on both sides of the striking member 12 can be formed with the same height. The different bump heights allow the flyswatter 10 to be effective with different sizes of insects. In a preferred embodiment, and with the swatting member 12 constructed of a typical plastic vinyl with which flyswatters are presently made, there would preferably be between 15 and 25 bumps uniformly distributed on each swatting surface 16 and 18.

The particular shape of the bumps 20 and 22 is not critical to the effectiveness of the invention. The bumps 20 and 22 can thus be formed with many shapes. One shape easy to implement would be a generally hemispherical shape. With this implementation, the protrusions on the striking surface of the flyswatter would indeed look like small bumps. Other shapes could be cones, pyramids, squares, rods, etc, as more fully described below. The bumps can be arranged on the striking surface in a grid pattern of rows and columns, with a spacing therebetween of one-inch, or more. Many other patterns or grid shapes of bumps on the striking member 12 can be utilized.

FIG. 4 illustrates the principles and concepts of the flyswatter 10 of the invention during a striking or swatting operation. A portion of the flyswatter 10 is illustrated as it appears just after contact has been made between the bumps 22 of the flyswatter 10 and the object 24 on which the insect rests. During a swatting operation, the flyswatter 10 is grasped by the handle 14 and swatted so that the swatting member 12 lands on a surface of the object 24 on which an insect 26 sets. As the swatting member 12 becomes adjacent to the object 24, the bumps 22 make contact with the object 24. The swatting member 12 itself may flex until it is entirely parallel with the object 24 at the end of the swatting operation. It is at this time that portions of the flyswatter 10 of the invention continue to flex to strike the insect 26 without smashing it. The kinetic energy of the swatting member 12, and especially each portion 28 that bridges or spans the bumps 22, causes such portions 28 to elastically deform and bow downwardly, as shown in FIG. 4. As used herein, elastic deformation includes its commonly accepted definition of a change in shape of a body that is reversible when the stress is removed. The downwardly deformed portions 28 of the swatting member 12 have the effect of striking the insect 26 with a sudden impact and immobilizing the insect 26 without smashing it onto the object 24. In many instances, the insect 26 will be killed or immobilized by being stunned without smashing it. It is possible, albeit a low probability, that the insect 26 will be struck by one of the bumps 22, in which event it will be smashed on the surface 24. It is believed that the portions 28 of the striking member 12 that elastically deform downwardly during the swatting operation do so with a snap action, based on the elasticity of the material with which the striking member 12 is constructed. In other words, the downwardly deflected portions 28 react very quickly to the stopping of the swatting member 12 on the object 24, thus imparting a substantial energy in a very short period of time to the insect 26 caught thereunder.

It can be seen from the foregoing that the bumps 22 maintain the crown portions of the elastically deformed portions of the swatting member 12 elevated above the surface of the object 24, and prevent direct contact with the object. It can also be seen that there is a relationship between the spacing of the bumps 22, the height of the bumps 22 and the elasticity of the striking member 12. The spacing of the bumps 22 can be reduced if the elasticity of the striking member 12 is increased. In like manner, the height of the bumps 22 can be made greater if the elasticity, and/or the tendency to change the shape of the striking member 12 is increased.

Figure 5:
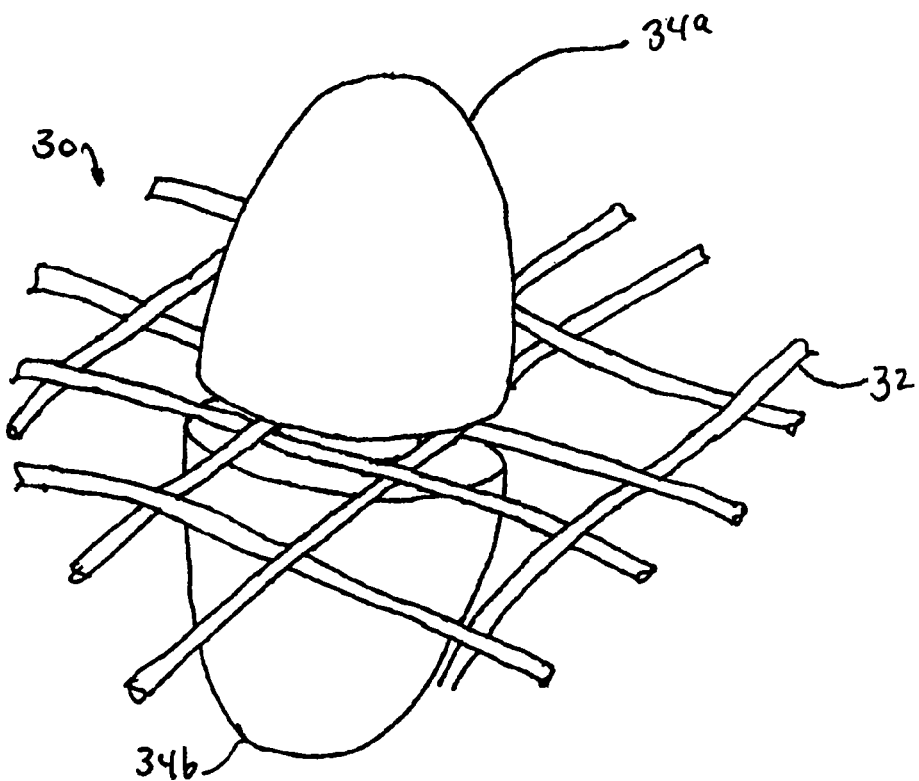
FIG. 5 is another embodiment employing a screen-type striking member with bumps embedded therein.

FIG. 5 illustrates another embodiment of the invention. Here, the flyswatter 30 is constructed with the striking member 32 made of a fine-mesh wire netting. Small plastic parts 34a and 34b, such as bump half parts, can be made in such a manner that they are insertable through the wire mesh of a typical wire-constructed flyswatter, and captured in the medial position within the wire mesh of the striking member 32. This would result in one half of the plastic part 34a protruding from one side of the wire mesh striking member 32, and the other half of the plastic part 34b protruding from the other side of the wire mesh striking member 32. Such an arrangement would allow for the same gap effect that is achieved with the striking member 12 that has the bumps 20 and 22 molded onto its surface. These small plastic parts 34a and 34b can also be molded as two separate pieces that snap together and capture the fine mesh wire netting of the striking member 32 therebetween.

Figure 6:
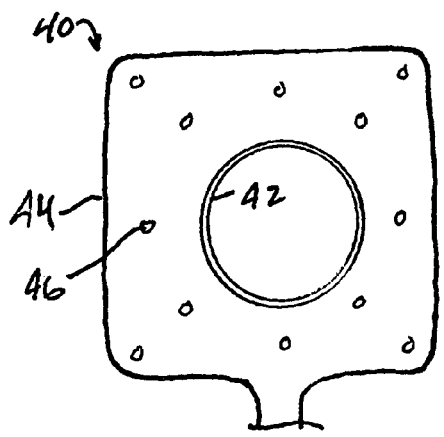
FIG. 6 is another embodiment of the invention employing a combination of curved ridges and bumps.

FIG. 6 illustrates yet another embodiment of the flyswatter according to the invention. The flyswatter 40 includes a circular rib 42 formed generally in the center of the striking member 44. The rib 42 need not be circular, but could be oval or some other geometric shape. In addition, the rib 42 need not be continuous, as shown, but could have breaks in it. Shown spaced around the circular rib 42 are other bumps, one shown as numeral 46.

Figure 7:
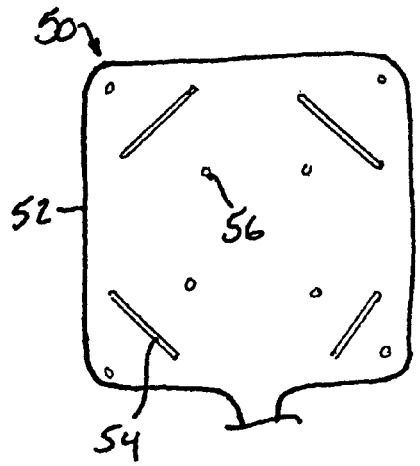
FIG. 7 is yet another embodiment employing linear ridges and bumps.

FIG. 7 depicts a flyswatter 50 constructed according to another embodiment of the invention. The striking member 52 has formed thereon one or more linear ribs 54, and spaced around the ribs 54 are one or more bumps 56. The location and number of ribs 54 and bumps 56 can be varied in a manner different from that shown. In addition, different combinations of curved ribs, linear ribs and bumps can be employed on a swatting member to achieve the desired effect described above.

Figure 8:
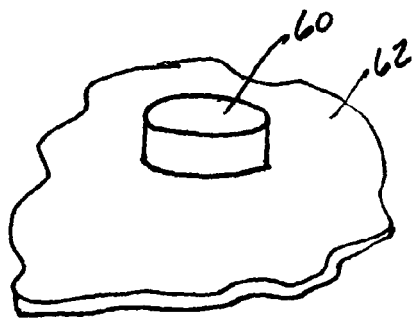
FIG. 8 is an isometric view of a bump having a pillar shape.

FIG. 8 illustrates a bump 60 formed with a pillar shape. The bump 60 is either formed integral with the swatting member 62, or attached thereto by suitable means. The pillar-shaped bump 60 has a flat end to thereby reduce marring or otherwise causing delicate surfaces from being dented when struck by the bumps 60 of the flyswatter during a swatting operation. The edges of the bumps could be rounded to remove any sharp corners. The bumps 60 are preferably constructed with a size and of a relatively hard material so as not to deform substantially during the swatting operation. This allows the swatting member 62 to undergo an elastic deformation and bow outwardly without being cushioned by the bumps. Similarly, it is preferable that the bumps formed on the top and bottom sides of the swatting member 12 be aligned with each other. This alignment of the bumps allows the area of the swatting member 12 between the bumps to be elastically deformed without being affected by the weight of a bump above the deflected portion of the swatting member 12. A bump located on a top surface of the swatting member 12 without a bump also located just below the top bump, would be undesirable, as a lone top bump would function as a weight on the deflecting portion of the swatting member and would slow down the response, but increase the extent by which the swatting member is elastically deformed.

Figure 9:
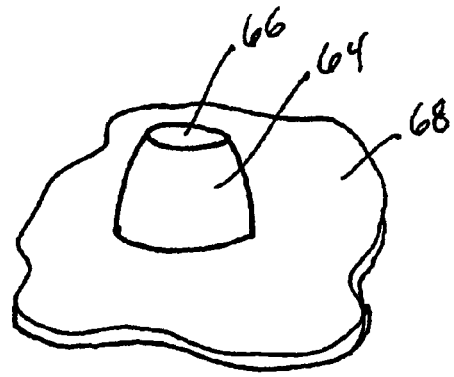
FIG. 9 is an isometric view of a bump having somewhat of a hemispherical shape with a blunt end.

FIG. 9 illustrates another type of bump 64 which can be employed with the invention. The bump 64 is generally hemispherical shaped with a blunt or flat top 66. The blunt top 66 reduces marring of delicate surfaces, in the manner noted above in connection with the bump 60 of FIG. 8. The bump 64 can be molded to or fastened to the swatting member 68.

Figure 10:
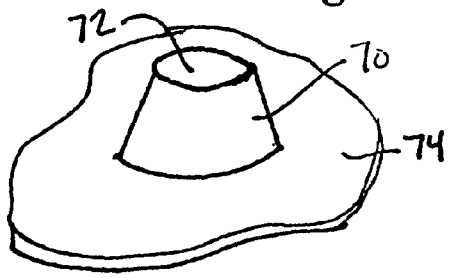
FIG. 10 is an isometric view of a bump with a truncated cone shape.

FIG. 10 illustrates another bump 70 that is cone-shaped, but with a truncated top 72. The bump 70 can be mounted to or formed integral with the swatting member 74.

While various shapes of bumps are described above, the invention is not limited to such shapes. Those skilled in the art may find that other bump shapes, including ridge shapes, can be utilized without departing from the concepts of the invention.

The advantages of the invention can be appreciated by understanding that a typical insect 26, with its fragile body, can be immobilized or mortally wounded, without smearing, by the application of a relatively small impact force from a flyswatter 10. The insect 26 does not need to be fully compressed between the object and the striking surface 18 of a flyswatter 10. While this certainly will result in the death of the insect 26, it also causes an unnecessary mess. The mess often resulting from swatting an insect can be reduced by the use of a much smaller force, quickly applied, which still results in the destruction of the insect. When protrusions are present on the striking member of a flyswatter, at the moment of impact of the flyswatter on an object, portions of the swatting member around the protrusions will elastically deflect toward the object. However, there may still be a small gap between the object and the deflected portions of the striking member of the flyswatter. The gap indicates that the deflection of the swatting member has not been stopped by contact with the object being struck by the protrusions. The existence of the gap enhances the impact force imparted to the insect. Instead of being squeezed to near zero thickness (smeared or smooshed), the insect is only squeezed or compressed to a thickness approximately equal to either the height of the protrusions, or the spacing of the gap.

At the instant that a typical flyswatter operation is completed, the elastic material of the striking member momentarily flexes and deflects due to the high force of impact. This results in a relatively large radius of deflection, or bowing outwardly, of that portion of the striking member spanning the protrusions. At the moment of impact between the protrusions and the object, the elastic deformation of portions of the swatting member will bow outwardly in a snap action toward the object. After being fully deformed outwardly, the deflected portions of the swatting member will snap back, similar to the action of a rubber band snapping, thus imparting impact energy to any insect which happens to be struck by the deflecting portion of the swatting member. Such action can damage the insect's wings or other parts of its body, or kill the insect. The effect of this is that the insect is stunned, otherwise immobilized, or killed without any mess at all, or at least a reduced degree of messiness.

From the foregoing, disclosed is a flyswatter constructed to reduce the smearing of an insect when squeezed against an object surface. The flyswatter of the invention includes a swatting member with spaced-apart protrusions on a surface thereof for contacting the object on which the insect rests. Portions of the swatting member located between the protrusions are adapted for elastic deformation when the protrusions strike the object. The elastic deflection of the numerous parts of the swatting member is effective to quickly strike the insect without smearing it on the object. The snap action of the deflecting swatting member imparts sufficient energy to the insect to destroy it without completely compressing the insect onto the object.

While the preferred and other embodiments of the invention have been disclosed with reference to flyswatters, it is to be understood that many changes in detail may be made as a matter of engineering choices without departing from the spirit and scope of the invention, as defined by the appended claims. In addition, not all of the features and advantages of the invention need be employed to realize the individual aspects thereof. Accordingly, those skilled in the art may find that various of the aspects of the invention may form a combination that provides advantages in particular situations.

What is claimed is:

1. A flyswatter for killing an insect of a predetermined height and lateral size, comprising:
   a stiff handle;
   an elastically deformable, molded plastic swatting member having at least one striking surface for striking an insect when the insect is resting on an object, said swatting member attached to said handle; and
   said at least one striking surface having disposed thereon a plurality of spaced-apart non-filament protrusions integrally molded with the striking surface, said plurality of protrusions occupying about ten percent, or less, of an area of said at least one striking surface, said protrusions being relatively hard so as not to bend, compress or deform substantially when the at least one swatting surface is struck against the object, and having shapes that are wider at the bottom than at the top, said protrusions also being spaced apart sufficiently over the at least one striking surface of said swatting member so that the insect can be between said protrusions without being squeezed between said protrusions, and deformable portions of said swatting member between said protrusions adapted for killing an insect resting on the object without smearing the insect on the object;
   wherein each of said plurality of protrusions is laterally separated from adjacent ones by a distance greater than a height of the protrusions so that, when the swatting member is struck against the object on which the insect rests, portions of the elastically deformable swatting member located between adjacent protrusions deform sufficiently so that one of said portions of said elastically deformable swatting member contacts the insect, and each of said plurality of protrusions do not substantially deform when struck against the object on which the insect rests.

2. The flyswatter of claim 1, wherein each of said plurality of protrusions is laterally separated from adjacent ones of the plurality of protrusions by more than about one inch.

3. The flyswatter of claim 1, wherein said swatting member includes a plurality of apertures formed therethrough.

4. The flyswatter of claim 1, wherein said handle, said swatting member and protrusions are molded as an integral unit.

5. The flyswatter of claim 1, wherein said at least one striking surface defines a first striking surface located on one side of said swatting member, and further including a second striking surface located on an opposite side of said swatting member, said second striking surface having an other plurality of protrusions formed at spaced-apart locations thereon, and formed with heights different from a height of the plurality of protrusions located on said first striking surface.

6. The flyswatter of claim 1, wherein said protrusions are a combination of bumps and ridges.

7. The flyswatter of claim 1, wherein each of said plurality of protrusions are pillar-shaped with flat ends.

8. The flyswatter of claim 1, wherein the plurality of protrusions further comprise a rib.

9. The flyswatter of claim 1, wherein each of the plurality of protrusions is comprised of a bump.

10. The flyswatter of claim 1, wherein each of said plurality of protrusions has a characteristic dimension parallel to a plane in which the at least one striking surface lies that is between 0.23 and 6.6 times the height of the protrusion.

11. The flyswatter of claim 1, having between 0.74 and 1.56 protrusions per square inch on the at least one striking surface.

12. The flyswatter, comprising:
   a stiff plastic handle;
   a molded plastic swatting member having a swatting surface on each side thereof, each said swatting surface adapted for striking an insect on an object, and said swatting member attached to said handle;
   each said swatting surface having a plurality of spaced-apart, non-filament plastic bumps integrally molded as part of the molded plastic swatting member and projecting above the respective swatting surfaces, said plurality of bumps occupying about ten percent, or less, of an area of each said swatting surface, portions of said swatting member located between neighbor bumps constructed so as to be deformed toward the object when the swatting member is struck against the object, without being cushioned by said bumps, said deformation being convex so that crown portions of the deformed portions approach the object and strike the insect on the object so that the insect is not smeared on the object, and each said deformed portion of said striking member returns to a rest state immediately subsequent to said deformation;
   said handle, said swatting member and said bumps all molded as an integral flyswatter;
   wherein a height of each of said plurality of bumps on each of said swatting surfaces is less than the distance at which each of the plurality of bumps is spaced apart from adjacent ones of the other of the plurality of bumps on each of the swatting surfaces, and wherein each of said plurality of bumps does not substantially deform, bend or compress when the swatting member is struck against the object.

13. The flyswatter of claim 1, wherein said plurality of protrusions are molded as bumps.

14. The flyswatter of claim 1, wherein said swatting member is constructed so that said portions thereof between adjacent ones of said plurality of protrusions deform sufficiently to contact the insect but not the object, without using an excessive striking force.

15. The flyswatter of claim 12, wherein said swatting member is constructed so that said portions thereof between said neighbor bumps deform sufficiently to contact the insect but not the object, without using an excessive striking force.

16. The flyswatter of claim 12, wherein each of said plurality of bumps has a characteristic dimension parallel to a plane in which each of the swatting surfaces lie of between 0.23 and 6.6 times the height of the bump.

17. The flyswatter of claim 12, having between 0.74 and 1.56 bumps per square inch on each of the swatting surfaces.

18. The flyswatter of claim 12, wherein each of the plurality of bumps is separated from adjacent bumps by at least one inch.

* * * * *